US010655939B1

(12) United States Patent
Ripley et al.

(10) Patent No.: US 10,655,939 B1
(45) Date of Patent: May 19, 2020

(54) THERMAL PROTECTION BARRIER FOR DELAYING ACCESS

(71) Applicant: Consolidated Nuclear Security, LLC, Reston, VA (US)

(72) Inventors: Edward B. Ripley, Knoxville, TN (US); Jacob Miller, Oliver Springs, TN (US); Michael J. Renner, Oak Ridge, TN (US); Walter Duerksen, Norris, TN (US); Jonathan Morrell, Knoxville, TN (US)

(73) Assignee: Consolidate Nuclear Security, LLC, Oak Ridge, TN (US)

( * ) Notice: Subject to any disclaimer, the term of this patent is extended or adjusted under 35 U.S.C. 154(b) by 0 days.

(21) Appl. No.: 15/994,055

(22) Filed: May 31, 2018

Related U.S. Application Data

(63) Continuation-in-part of application No. 15/040,478, filed on Feb. 10, 2016, now abandoned.

(51) Int. Cl.
*F41H 5/04* (2006.01)
*E04B 1/94* (2006.01)
*B32B 3/12* (2006.01)
*B32B 5/16* (2006.01)
*B32B 5/18* (2006.01)
(Continued)

(52) U.S. Cl.
CPC ......... *F41H 5/0428* (2013.01); *E04B 1/941* (2013.01); *F41H 5/0492* (2013.01); *B32B 3/12* (2013.01); *B32B 5/16* (2013.01); *B32B 5/18* (2013.01); *B32B 9/007* (2013.01); *B32B 9/048* (2013.01); *B32B 18/00* (2013.01); *B32B 2264/102* (2013.01); *B32B 2264/108* (2013.01); *B32B 2264/12* (2013.01); *B32B 2266/0214* (2013.01); *B32B 2307/306* (2013.01); *B32B 2307/714* (2013.01); *B32B 2315/02* (2013.01); *B32B 2325/00* (2013.01); *B32B 2375/00* (2013.01);
(Continued)

(58) Field of Classification Search
CPC ...................................................... F41H 5/0428
See application file for complete search history.

(56) References Cited

U.S. PATENT DOCUMENTS 5,750,927 A   5/1998  Baltazar
6,568,310 B2  5/2003  Morgan
(Continued)

FOREIGN PATENT DOCUMENTS

WO    2011104501    9/2011

OTHER PUBLICATIONS

Natarajan et al., Heat transfer in vertical granular flows Apr. 2007, Experimental Heat Transfer, pp. 1-3 (Year: 2007).*
(Continued)

*Primary Examiner* — Samir Shah
*Assistant Examiner* — Tong Guo
(74) *Attorney, Agent, or Firm* — Luedeka Neely Group, P.C.; Michael J. Renner, Esq.

(57) ABSTRACT

A thermal protection barrier including a base layer having a plurality of baffles with perforated walls and a high melting temperature granular media disposed within the plurality of baffles. When the base layer is breached by a thermal threat, the granular media is operable to flow through the perforated walls of the plurality of baffles to provide a controlled flow of granular media to an area proximate the breach for thwarting the thermal threat.

24 Claims, 3 Drawing Sheets

(51) Int. Cl.
*B32B 9/00* (2006.01)
*B32B 9/04* (2006.01)
*B32B 18/00* (2006.01)

(52) U.S. Cl.
CPC ....... *B32B 2571/00* (2013.01); *E04B 2103/02* (2013.01)

(56) References Cited

U.S. PATENT DOCUMENTS

| | | |
|---|---|---|
| 7,637,073 B2 | 12/2009 | Elliott et al. |
| 7,866,248 B2 | 1/2011 | Moore, III et al. |
| 8,371,647 B2 | 2/2013 | Ripley |
| 2005/0031843 A1* | 2/2005 | Robinson ............... B32B 33/00 428/293.4 |
| 2008/0063875 A1 | 3/2008 | Robinson et al. |
| 2010/0236796 A1* | 9/2010 | Chattaway ............. A62C 37/44 169/46 |
| 2014/0329079 A1* | 11/2014 | Liu ........................... B32B 5/18 428/317.1 |

OTHER PUBLICATIONS

Chaudhuri et al. Experimentally Validated Numerical Modeling of Heat Transfer in Granular Flow, (Year: 2011).*
Watkins et al. , Heat Transfer to Vertical Dense Granular Flows at High Operating Temperature, (Year: 2017).*
Natarajan, Heat Transfer in Vertical Granular Flows, vol. 10, Issue 2, 1997.
Chaudhuri, Bodhisattwa, Experimentally Validated Numerical Modeling of Heat Transfer in Granular Flow in Rotating Vessels, Feb. 14, 2011.

* cited by examiner

THERMAL PROTECTION BARRIER FOR DELAYING ACCESS

CROSS-REFERENCE TO RELATED APPLICATION

This application claims priority as a continuation-in-part to co-pending U.S. application Ser. No. 15/040,478 filed Feb. 10, 2016, and entitled "Thermal Protection Barrier," the entire contents being incorporated by reference herein.

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to a thermal protection barrier. More particularly, this disclosure relates to a thermal protection barrier operable to extinguish/slow the advancement of a thermal charge by applying a constant flow of granular media to the thermal charge.

BACKGROUND

Various pyro-metallurgical processes require high-temperature thermal treatments to bring about physical and chemical transformation in materials. For example, thermite is well understood to cause an exothermic reaction between a metal and a metal oxide that can burn at temperatures of 2500° C. or greater. As a result, a thermite charge poses a significant threat to thermally sensitive systems and/or equipment that may be inadvertently contacted by the thermite charge. Similarly, superheated molten metals, such as a thermite charged flame, are often used to gain unlawful entry to secure locations.

What is needed therefore is an effective arrangement of materials to provide an effective thermal protection barrier against superheated molten metals.

SUMMARY

According to one embodiment of the disclosure, a thermal protection barrier includes a base layer including a plurality of baffles having perforated walls and a high melting temperature granular media disposed within the plurality of baffles. When the base layer is breached by a thermal threat, the granular media is operable to flow through the perforated walls of the plurality of baffles to provide a controlled flow of granular media to an area proximate the breach for thwarting the thermal threat.

According to certain embodiments, the granular media includes silica sand, alumina sand, magnesia sand, silicon carbide, and combinations thereof; the thermal protection barrier further includes a heat resistant layer disposed adjacent the base layer that is preferably substantially perpendicular to the perforated walls of the plurality of baffles and is composed of carbon, a high melting temperature ceramic, and combinations thereof or a high melting temperature ceramic disposed between sheets of carbon; the thermal protection barrier further includes a standoff layer disposed on a side of the heat resistant layer opposite from the base layer that is preferably composed of a polymer foam; the thermal protection barrier further includes a metal housing disposed around the standoff layer, heat resistant layer, and the base layer; the thermal protection barrier is a security door or wall and preferably includes a second heat resistant layer disposed on a side of the base layer opposite from the first heat resistant layer; and/or the thermal protection barrier further includes a plurality of base layers disposed between one of a heat resistant layer and a standoff layer.

According to another embodiment of the disclosure, a method for protecting a thermally sensitive system from a thermal threat is provided that includes (a) providing a thermal protection barrier having a base layer including a plurality of baffles having perforated walls and a high melting temperature granular media disposed within the plurality of baffles; and (b) positioning the thermal protection barrier over the thermally sensitive system such that, when the base layer is breached by the thermal threat, the granular media is operable to flow through the perforated walls of the plurality of baffles to provide a controlled flow of granular media to an area proximate the breach.

According to yet another embodiment of the disclosure, a thermal protection barrier includes a base layer having a high melting temperature granular media disposed within the base layer and a distributor grid layer composed of a high melting temperature material disposed adjacent to the base layer dimensioned and configured to divide and disperse a superheated flowing mass to the granular media of the base layer upon occurrence of a breach of the base layer.

According to certain embodiments, the high melting temperature granular media includes a granular nuclear poison; the distributor grid layer includes a plurality of spaced-apart distributors and a standoff material comprising a polymer foam disposed in the spaces between the plurality of distributors; the thermal protection barrier further includes a high melting temperature containment layer disposed adjacent the base layer opposite the distributor grid layer for containing the high melting temperature granular media within the thermal protection barrier; and/or the thermal protection barrier further includes a metal housing disposed around the distributor grid layer, base layer heat resistant layer, and high melting temperature containment layer.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of the disclosure. It is to be understood that other embodiments may be utilized, and that structural changes may be made and processes may vary in other embodiments.

Figure 1:
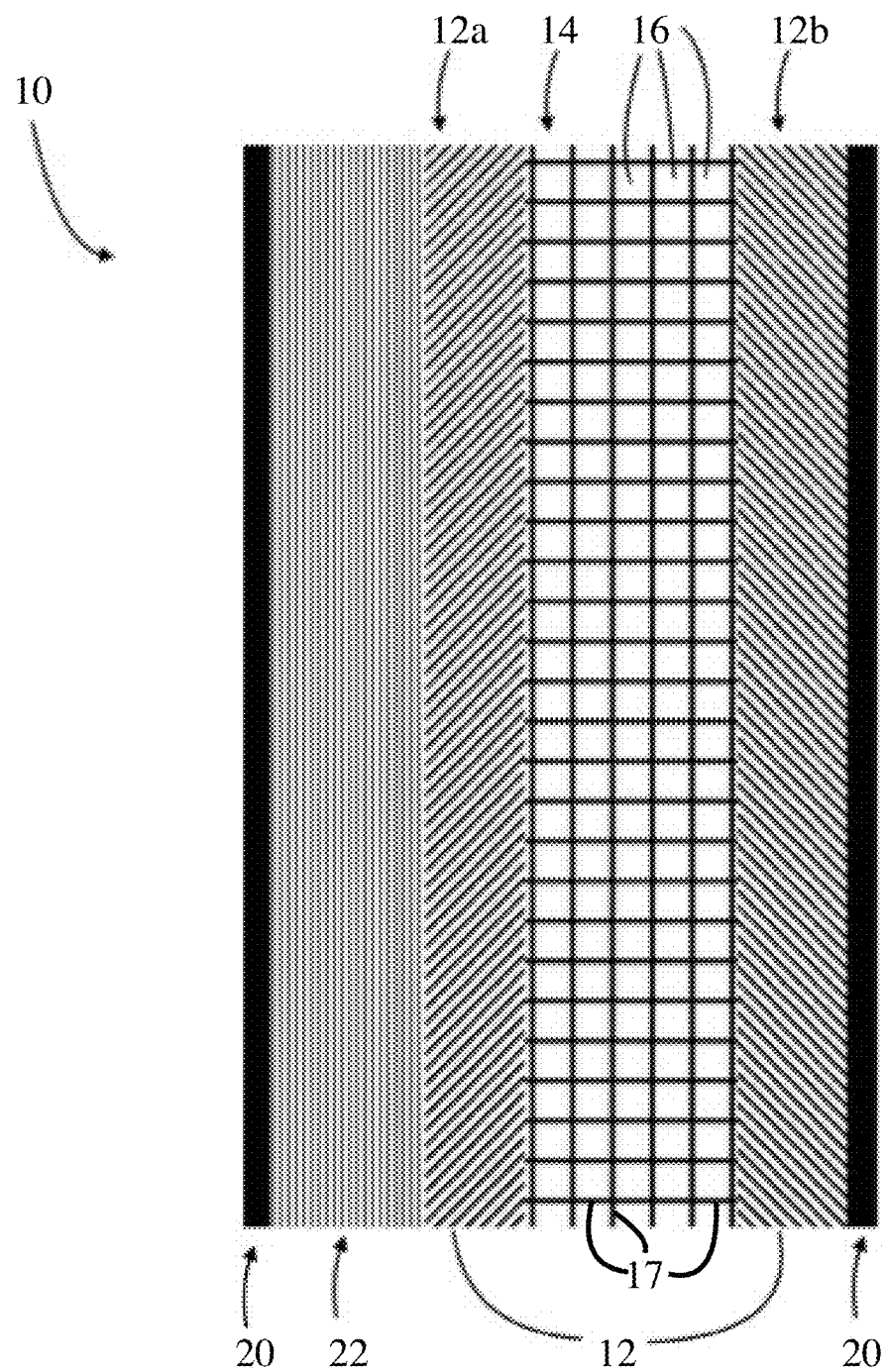
FIG. 1 depicts a cross sectional view of a thermal protection barrier according to one embodiment of the disclosure.

Referring to FIG. 1, the present disclosure broadly relates to a thermal protection barrier 10 preferably including one or more rigid heat resistant layers 12 preferably formed of carbon (and more preferably graphite due to its material properties and lower cost relative to other forms of carbon), a high temperature ceramic including, but not limited to, zirconia, alumina, silicon carbide, and boron carbide, and combinations thereof. In operation, the one or more heat resistant layers 12 generally require significant heat and time, such as from a continuous thermite flame, to penetrate or otherwise defeat each layer 12. In certain embodiments, the heat resistant layers 12 include a high temperature ceramic sandwiched between sheets of graphite or other form of carbon.

Adjacent to at least one of the heat resistant layers 12 is a cellular base layer 14 preferably formed of a plurality of interconnected baffles 16 each having at least one perforated wall 17 that the baffle 16 shares with an adjacent baffle 16. The interconnected baffles 16 are preferably formed in the form of a series of triangles, squares, hexagons, or other repeating structures sandwiched between a first heat resistant layer 12a and a second heat resistant layer 12b. Disposed within each of the baffles 16 of the cellular base layer 14 is a granular media having a high melting temperature and sufficiently sized to slowly flow in its solid form through the perforations of the base layer 14 (i.e., through the perforated walls 17 of the baffles 16) upon breach of the base layer 14 in a manner similar to how sand flows through an hour glass. For purposes herein, it is considered a breach of the base layer 14 once a thermal threat reaches the base layer 14 of the thermal protection barrier 10. In preferred embodiments, the granular media includes silica sand, alumina sand, magnesia sand, silicon carbide, and combinations thereof. It is noted that the base layer 14 filled with granular media also provides stiffness and rigidity to the chosen configuration of the thermal protection barrier 10.

In preferred embodiments, the baffles 16 are sufficiently "packed" with "free standing" granules of a high melting temperature granular media. The granules are referred to as being "packed" because flow of the granular media through the perforations of the baffle walls 17 is substantially prevented unless there is a breach of the base layer 14 or, as explained below, the thermal protection barrier 10 is exposed to a blast or other type of shock wave that provides sufficient force to cause movement of the granular media. The granules are referred to as being "free standing" because they are not suspended within or otherwise surrounded by any type of resin, slurry or other suspension medium, or structure that prevents independent flow of the granules. Stated another way, the granules are "free standing" because the baffles 16 contain only granules and gas. On the other hand, as exemplified further below particularly with respect to FIG. 2, if the heat resistant layer 12 is penetrated by a thermal threat sufficiently to reach the base layer 14, the "free standing" granules are "released" by the breach (i.e., the "packed" nature of the granules within the baffles 16 no longer exists) such that the granular media can flow through appropriately sized perforations in the walls 17 of the baffles 16 at a relatively controlled rate towards the breach.

In operation, once the heat resistant layer 12a of the thermal protection barrier 10 is penetrated sufficiently by a thermal threat such as a thermite charge so that a breach of the base layer 14 occurs, the granular media flows toward the charge from the baffles 16 proximate to where the breach occurred. As a result, the granular media will absorb heat and extinguish or slow the advancement of the thermal threat. Further, once the granular media begins to flow towards the threat from the baffles 16 proximate to the breach, the granular media from remote baffles 16 will continually flow through the perforations in the baffle walls 17 of the base layer to the baffles 16 proximate to the breach to replenish the granular media that is extinguishing/slowing/thwarting the advancement of the thermal threat. This replenishing continues until all the granular media able to flow towards the breach has flowed out of the base layer 14. In certain embodiments, particularly when the thermal protection barrier 10 is used to protect thermally sensitive systems from superheated molten metals, the granular media may also exploit a phase change (e.g., from silica sand to a molten glass) when the granular media reaches the baffles 16 proximate the breach to absorb heat from the superheated molten metal and help prevent the superheated metal from defeating the thermal protection barrier 10 or otherwise accessing the area beyond the thermal protection barrier 10.

Figure 2:
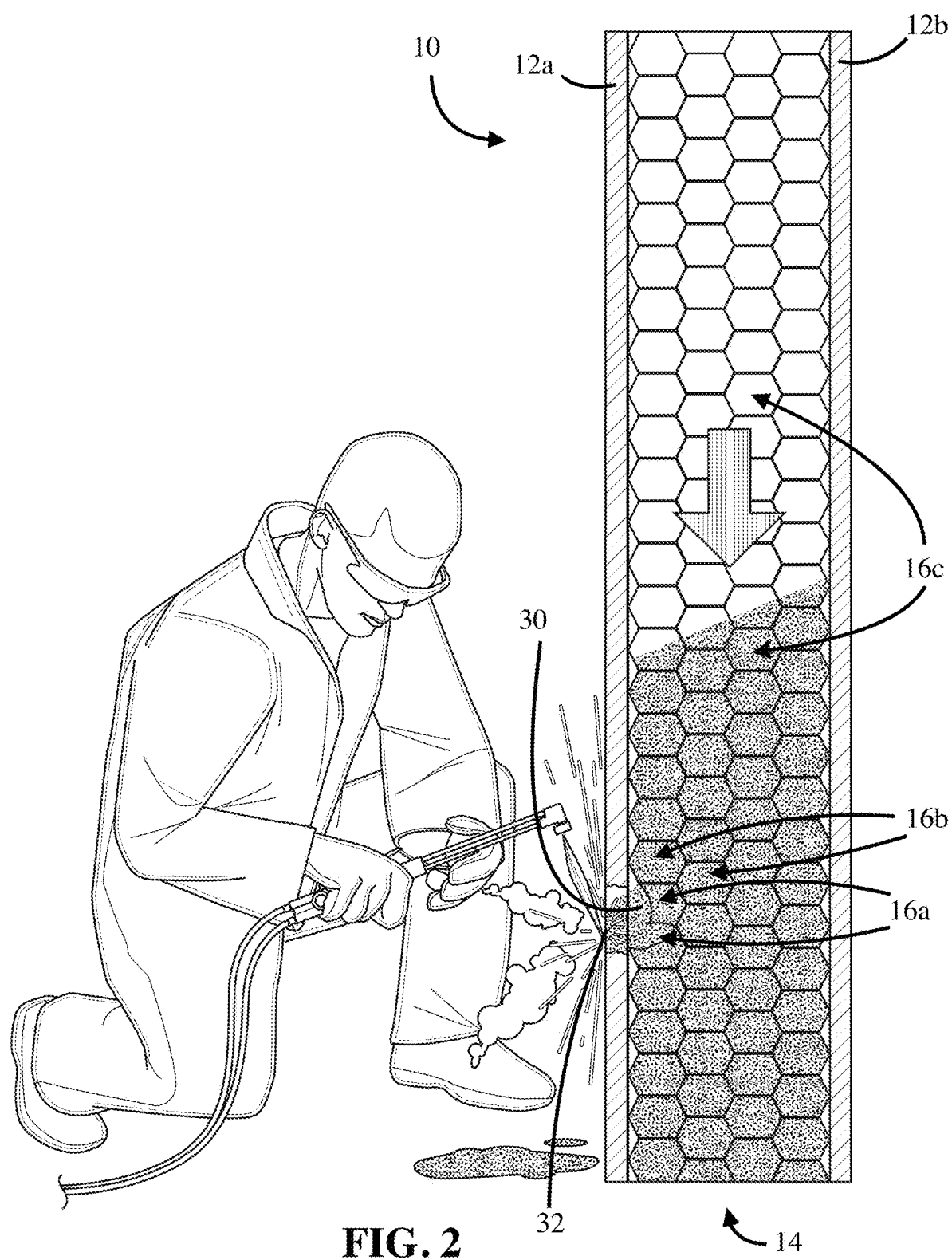
FIG. 2 depicts a cross sectional view of a thermal protection barrier as it is being breached by an intruder and the granular media is flowing within the base layer towards the breach according to one embodiment of the disclosure.

Referring to FIG. 2, it is contemplated that one exemplary embodiment of the thermal protection barrier 10 is a security door or similar structure in which an intruder attempts to gain access using a thermal flame. According to this embodiment, the heat resistant layer 12a acts as an initial barrier to burning through the door with the thermal flame. When an intruder successfully penetrates the heat resistant layer 12a of the security door so as to breach base layer 14 as represented by breach 30, the granular media 32 will extinguish/thwart the thermal flame by flowing out of baffles 16a of the cellular base layer 14 proximate to the area of the breach 30. The granular media will then continue to flow from adjacent baffles 16b into the baffles 16a that are proximate the breach 30 (principally adjacent baffles 16b above and beside the immediate area of the breach 30) to continue extinguishing/thwarting the thermal flame at the breach 30. As the granular media from baffles 16a proximate the breach and baffles 16b adjacent the breach flows towards the breach 30, granular media will flow from baffles 16c remote from the breach towards the breach 30. This controlled flow from remote baffles 16c towards the breach 30 will result in continued extinguishing/thwarting of the thermal flame until the volume of granular media that is able to flow from remote baffles 16c to the breach is exhausted.

As should be understood in reference to FIG. 2, each of the baffles 16 of base layer 14 were initially "packed" with the "free standing" granular media 32. Thus, the "empty" and "partially empty" remote baffles 16c shown in FIG. 2 above the breach signify that the intruder has been attempting to gain access to barrier 10 for a significant amount of time due to the controlled flow of the media 32 from the remote baffles 16c towards the breach 30. Further, the "empty" remote baffles 16c signify how the granular media 32 from a remote and undamaged area of the base layer 14 is able to flow towards the breach 30 due to the "free standing" nature of the granular media and appropriately sized perforations in the undamaged baffle walls 17.

If the intruder somehow successfully defeats the base layer 14 before an armed response arrives, the intruder preferably encounters another heat resistant layer 12b, which requires additional time and/or a different type of tool to defeat. Accordingly, thermal protection barrier 10 provides significant time delay for security personnel to respond to an attempted defeat of the security structure.

According to certain embodiments, the gas within base layer 14 is intended to help suppress the thermal threat. For example, the thermal protection barrier may include a fire suppressing gas, for example a noble gas such as nitrogen, argon, and/or carbon dioxide, which helps to reduce oxygen levels around a fire when released from the base layer 14. In embodiments where the gas within the base layer 14 is intended to help suppress a thermal threat, the thermal protection barrier 10 may further include a sealing layer intended to help contain the gas within the base layer 14 until a breach occurs. According to some embodiments, the base layer 14 may also be connected to an external gas system that is designed to introduce a fire suppressing gas to the base layer 14 upon a breach. For example, with reference to FIG. 2, a gas system may be connected to the base layer adjacent a portion of a security door. When a breach is detected, the gas system introduces a noble gas to the interconnected baffles 16c. Optionally, the gas may be introduced under pressure. When a gas system is connected to a top portion of a security door, the noble gas then flows with the free standing granular media 32 towards the breach 30. When a gas system is connected at or near the bottom portion of a security door and the gas (either a fire suppressing gas or a non-fire suppressing gas such as air) is introduced under sufficient pressure, the resulting fluidized bed aids the flow of the free standing granular media 32 towards the breach 30.

According to some embodiments, the thermal protection barrier 10 includes a plurality of base layers 14 substantially as described above sandwiched between heat resistant layers 12. For example, the thermal protection barrier may include a first heat resistant layer 12a, first base layer 14, second heat resistant layer 12b, and another base layer disposed on the end of the second heat resistant layer 12b opposite from the first base layer 14. According to this embodiment, the thermal protection barrier provides successive layers of flowable granular media. In other words, once an intruder defeats the second heat resistant layer 12b and breaches the second base layer, yet another flow of granular media is encountered from the second base layer. Depending on the relative thickness of the layers and the size of the breach area, it is noted granular media may flow between the first and second base layers when the second heat resistant layer 12b is defeated.

According to embodiments in which the thermal protection barrier 10 is used for security purposes, it is also noted that the granular media within the base layer 14 serves as an effective blast resistant barrier. In this regard, the granular media is operable to spatially spread the force exerted on the thermal protection barrier 10 by allowing the granular media to flow within the baffles 16 when base layer 14 is breached or to move without flowing when base layer 14 is not breached. This spatial spreading of the granular media away from the direction of the blast absorbs a significant portion of the energy of the blast and causes the force to be applied over a larger surface area. In addition to spatially spreading the force applied to the thermal protection barrier 10 from an explosion, the granular media spreads the applied force over time by requiring the transmission of the force from particle to particle of the granular media. This energy transfer takes far more time than transfer of such energy through a solid material. Further, individual particles, after becoming nearly fully compacted, typically absorb further energy from the blast by being displaced in a direction that is generally transverse to the initial force. This partial re-direction of the force delays the transfer of energy and reduces the peak level of energy that is received by the thermal protection barrier 10 from a blast.

In a related embodiment, thermal protection barrier 10 is positioned to protect thermally sensitive systems and equipment from damage by excessive heat and inadvertent contact with superheated molten metals during metallurgical processes. For example, thermal protection barrier 10 may be placed over a thermally sensitive system intended to be protected while a metallurgical process is being performed in the area adjacent to the system. As explained above, the flowing granular media of the thermal protection barrier 10 serves to contain and shunt the damaging concentration of heat from any superheated metal that would have unintentionally contacted the thermally sensitive system if not for the thermal protection barrier 10. This containing/shunting provides time for the superheated metal to cool before completely defeating the thermal protection barrier 10 and/or time for an operator to recognize and treat the potential defeat by other means, such as a fire extinguisher. As noted above, when exposed to very high temperatures, the granular media will also exploit a phase change (e.g., from silica sand to a molten glass) to absorb heat from the superheated molten metal and prevent the metal from completely defeating the thermal protection barrier 10.

Referring again to FIG. 1, thermal protection barrier 10 typically includes additional layers adjacent to the heat resistant layers 12 and cellular base layer 14. In preferred embodiments and as shown in FIG. 1, thermal protection barrier 10 further includes a housing 20 made of steel, aluminum, or similar materials for sealing the various layers of the thermal protection barrier together. One or more standoff layers 22 may also be provided to provide "empty space" for additional blast resistance or, when replacing one or more of the heat resistant layers 12, to provide a barrier adjacent the base layer 14 to prevent the flow of granular media prior to a breach. In preferred embodiments, the standoff layers 22 are formed of expanded polymer foam or similar material as known in the art such as polystyrene, polyurethane, or polyethylene.

According to embodiments where the thermal protection barrier 10 is intended to be blast resistant, such as the security door described above, a standoff layer 22 is preferably disposed between the housing 20 and the heat resistant layer 12a. According to this embodiment, the shock wave from the blast will penetrate the steel housing 20 by creating a hole in the housing 20, or simply by passing through the housing 20, and start to lose energy as it enters the foamed space between the steel housing 20 and the heat resistant layer 12a. Once the shockwave fills up the "empty" space of standoff layer 22, the shockwave will travel to the one or more cellular base layers 14 where the granular media will sufficiently absorb what remains of the shockwave as described above so that any unexpended energy will be directed back towards the origin of the explosion. This should effectively reduce the blast to the point where it does not sufficiently penetrate the entire thickness of the thermal/security barrier itself so as to defeat the thermal/security barrier.

In summary, thermal protection barrier 10 utilizes a series of successive layers to address various types of assaults and dangers to thermally sensitive systems posed particularly from superheated molten materials. More specifically, thermal protection barrier 10 includes a base layer 14 of flowable granular media that exploits the latent heat absorption/fusion from the flowing granular media for thermal management. It should be understood that the layers of the protection barrier 10 described above can be varied as desired within the spirit of the disclosure and easily combined in barriers of varying size and shapes to protect any number of potential structures or to form part of a structure that itself is thermally protected (e.g., security door, safe, walls and steel beams for buildings, etc.).

Figure 3:
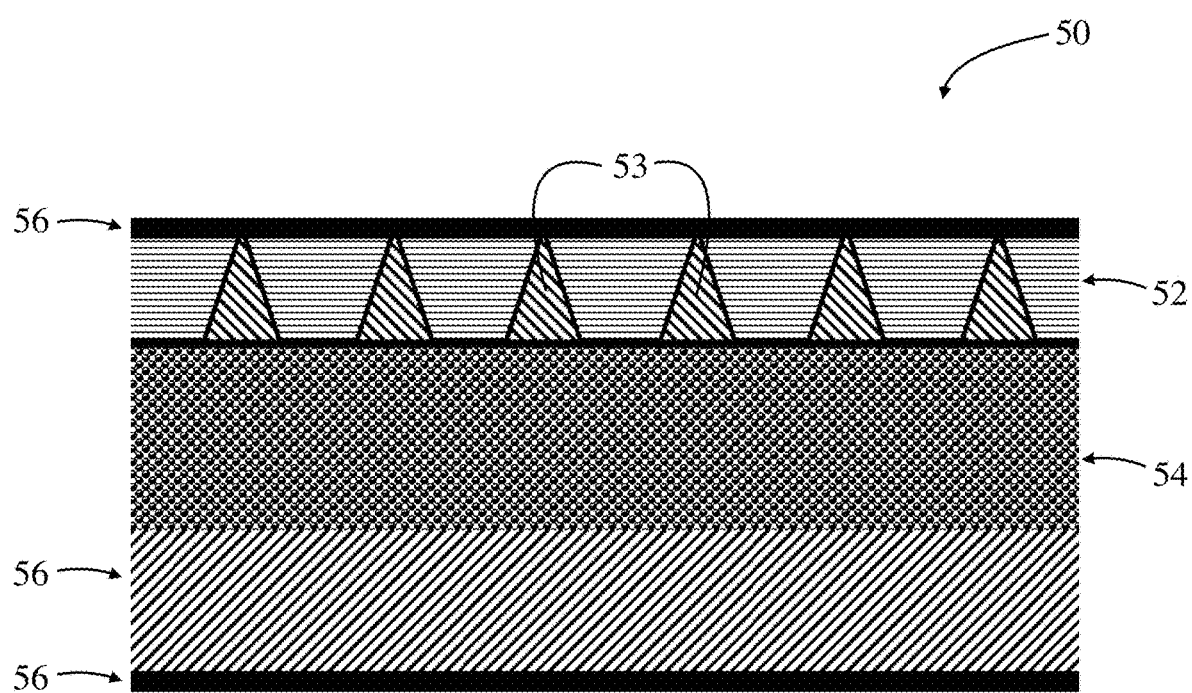
FIG. 3 depicts a cross sectional view of a thermal protection barrier according to another embodiment of the disclosure.

An alternate embodiment of the present disclosure provides thermal protection of nuclear systems such as nuclear power generation systems by adding a nuclear poison to the granular media of base layer 14 described above. Referring to FIG. 3, a preferred thermal protection barrier 50 for nuclear systems is exemplified. According to this embodiment, a distributor plate or grid layer 52 having a plurality of distributors 53 composed of a high melting temperature material such as carbon, boron carbide, silicon carbide, boron nitride, etc. is disposed on one side of the base layer 54 and a graphite or high temperature ceramic containment layer 56, similar to the heat resistant layer 12 described above in barrier 10, is disposed on the other side of the base layer 54 opposite the distributor grid 52. The containment layer 56 is operable to contain and sufficiently pack a granular media mixture within the base layer 54. The granular media mixture preferably includes silica sand, alumina sand, magnesia sand, silicon carbide, and combinations thereof along with a stable, high melting temperature, granular nuclear poison such as boron, boron nitride, or gadolinium. The base layer 54 may further include a gas such as a fire-suppressing gas as described above with respect to thermal protection barrier 10.

In operation, distributor grid layer 52 serves to divide and disperse a superheated flowing nuclear mass upon breach of a housing layer 56 (e.g., a "loss of coolant/containment accident" or LOCA) so that the nuclear mass is relatively evenly distributed to the granular media mixture of base layer 54. As the nuclear mass spreads and starts to mix with and melt the granular media mixture, the heat from the mass is quickly robbed as the mass tries to overcome the heat of fusion of the granular media resulting in the mass becoming quickly quenched. This further drives spreading of the remaining molten nuclear mass until the effective neutron multiplication factor (k) of the nuclear mass drops well below 1. In addition, the nuclear poison further reduces the effective neutron multiplication factor of the thermal mass. As a result, by evenly distributing the flowing mass to the mixture of base layer 54, the distributor grid 52 is able to prevent localized "burn through" of the thermal mass in a particular region of the base layer 54 and the molten mass is able to be quenched into a slab-like geometry.

In embodiments where the base layer 54 includes a fire suppressing gas, the fire-suppressing gas helps suffocate a fire or otherwise prevent a fire from initiating from the flowing nuclear mass. In certain embodiments, a gas system may be connected to the base layer 54 to provide a flowing gas to fluidize and disperse the granular media through the base layer 54. For example, a gas system may be connected to the bottom of the base layer 54 for providing a fluidized bed of granular media.

As noted above, barrier 50 preferably includes a metal housing layer 56. Together, the housing layer 56 and distributor grid 52 are designed to contain the media mixture 54 while allowing the superheated flowing mass to pass quickly into the interior of the thermal protection barrier 50 where it is attacked by the granular media of base layer 54. In preferred embodiments, the grid layer 52 further includes a standoff material such as expanded polymer foam or similar material such as polystyrene, polyurethane, or polyethylene disposed in open space within the distributor grid 52 to act as a void filler and prevent the granular media mixture of base layer 54 from shifting within barrier 50 regardless of the manner in which the barrier 50 is oriented (e.g., when barrier 50 is incorporated into wall and floor panels that house nuclear systems).

While thermal protection barrier 50 described above is designed to be particularly suited for protecting nuclear systems, it should be understood that it could also be used to protect other temperature sensitive systems. In particular, thermal protection barrier 50 is particularly suited to protect temperature sensitive systems when there is the potential for a superheated flowing mass of molten metal to break containment by evenly distributing the flowing mass to the granular media. When there is no potential for a nuclear threat, the nuclear poison can be omitted from the granular media 54 and a containment layer 56 may be provided adjacent to the distributor plate layer 52 opposite the granular media 54 thermal protection barrier 50.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A thermal protection barrier comprising:
   a base layer including a plurality of interconnected baffles, each of the plurality of baffles having at least one perforated wall that the baffle shares with an adjacent baffle; and
   free standing granules packed within each of the plurality of baffles such that flow of the granules within the plurality of interconnected baffles is substantially prevented unless there is a breach of the base layer,
   wherein, when a first portion of the base layer is breached by a thermal threat and a second portion of the base layer is not breached, the free standing granules are operable to flow (1) as free standing granules towards the thermal threat from baffles proximate to the breach, and (2) as free standing granules through the perforated walls of baffles disposed in the second portion of the base layer remote from the breach towards the baffles proximate the breach to continually replenish the free standing granules of the baffles proximate to the breach and provide a controlled flow of granules to the thermal threat.

2. The thermal protection barrier of claim 1 wherein the free standing granules include silica sand, alumina sand, magnesia sand, silicon carbide, or combinations thereof.

3. The thermal protection barrier of claim 1 further comprising a heat resistant layer disposed adjacent the base layer.

4. The thermal protection barrier of claim 3 wherein the heat resistant layer comprises carbon, a high melting temperature ceramic, or combinations thereof.

5. The thermal protection barrier of claim 3 wherein the heat resistant layer comprises a high melting temperature ceramic disposed between sheets of carbon.

6. The thermal protection barrier of claim 3 further comprising a standoff layer disposed on a side of the heat resistant layer opposite from the base layer.

7. The thermal protection barrier of claim 6 wherein the standoff layer comprises a polymer foam.

8. The thermal protection barrier of claim 6 further comprising a metal housing disposed around the standoff layer, heat resistant layer, and the base layer.

9. The thermal protection barrier of claim 8 wherein the thermal protection barrier is a security door or wall.

10. The thermal protection barrier of claim 9 further comprising a second heat resistant layer disposed on a side of the base layer opposite from the first heat resistant layer.

11. The thermal protection barrier of claim 1 further comprising a plurality of base layers disposed between one of a heat resistant layer and a standoff layer.

12. The thermal protection barrier of claim 1 wherein the perforations of the perforated walls of the interconnected baffles are sized and dimensioned to provide the controlled flow of granular media through the perforated walls.

13. The thermal protection barrier of claim 1 wherein the base layer contains a fire suppressing gas.

14. The thermal protection barrier of claim 13 wherein the fire suppressing gas includes a noble gas.

15. The thermal protection barrier of claim 13 wherein the fire suppressing gas is pressurized such that the fire suppressing gas is operable to flow within the plurality of interconnected baffles upon the first portion of the base layer being breached by the thermal threat to assist the flow of the free standing granules.

16. A method for protecting a thermally sensitive system from a thermal threat, the method comprising:
   providing a thermal protection barrier, the thermal protection barrier including a base layer including a plurality of interconnected baffles each having at least one perforated wall that the baffle shares with an adjacent baffle with free standing granules packed within each of the plurality of interconnected baffles such that flow of the granules within the plurality of interconnected baffles is substantially prevented unless there is a breach of the base layer; and
   positioning the thermal protection barrier to protect the thermally sensitive system such that, when a first portion of the base layer is breached by the thermal threat and a second portion is not breached, the free standing granules are operable to flow (1) as free standing granules towards the thermal threat from baffles proximate to the breach, and (2) as free standing granules through the perforated walls of baffles disposed in the second portion of the base layer remote from the breach towards the baffles proximate the breach to continually replenish the free standing granules of the baffles proximate to the breach and provide a controlled flow of granules to the thermal threat.

17. The method of claim 16 wherein the free standing granules includes silica sand, alumina sand, magnesia sand, silicon carbide, or combinations thereof.

18. The method of claim 16 wherein the thermal protection barrier further comprises a heat resistant layer disposed adjacent the base layer.

19. The method of claim 18 wherein the heat resistant layer comprises carbon, a high melting temperature ceramic, or combinations thereof.

20. The method of claim 18 wherein the heat resistant layer comprises a high melting temperature ceramic disposed between sheets of carbon.

21. The method of claim 18 wherein the thermal protection barrier further comprises a metal housing disposed around the heat resistant layer and the base layer.

22. The method of claim 18 wherein the thermal protection barrier further comprises a plurality of base layers disposed between a plurality of heat resistant layers.

23. The method of claim 18 further comprising a standoff layer disposed on a side of the heat resistant layer opposite from the base layer.

24. The method of claim 16 wherein the base layer contains a fire suppressing gas.

* * * * *